UNITED STATES PATENT OFFICE.

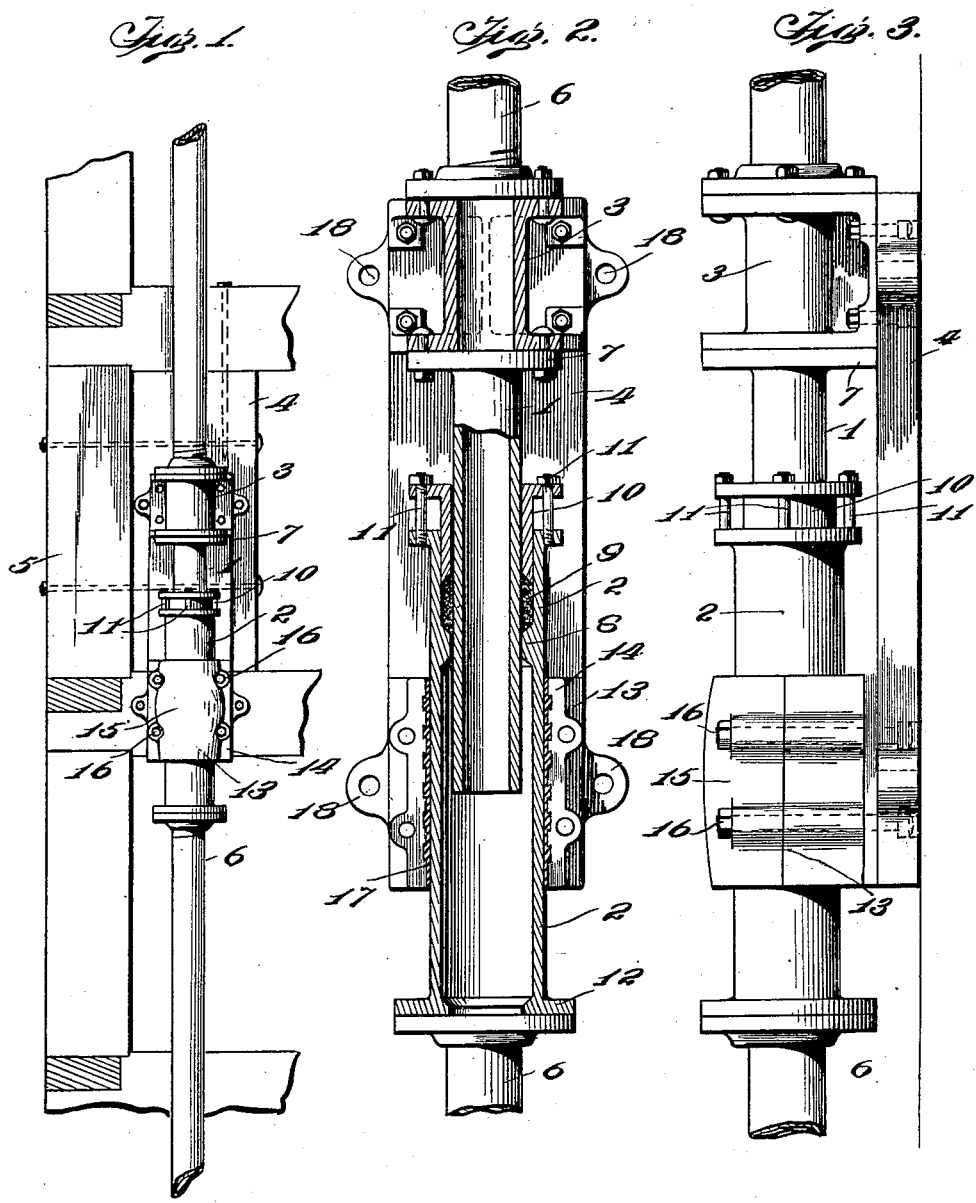

HENRY J. WESSINGER, OF DULUTH, MINNESOTA.

EXPANSION PIPE-JOINT.

SPECIFICATION forming part of Letters Patent No. 723,347, dated March 24, 1903.

Application filed October 6, 1902. Serial No. 126,145. (No model.)

*To all whom it may concern:*

Be it known that I, HENRY J. WESSINGER, a citizen of the United States, residing at Duluth, in the county of St. Louis and State of Minnesota, have invented certain new and useful Improvements in Expansion Pipe-Joints; and I do hereby declare the following to be a full, clear, and exact description of the invention, such as will enable others skilled in the art to which it appertains to make and use the same.

The present invention relates to improvements in expansion-joints for piping, and particularly to that class of expansion-joints known as "slip-joint," in which one member of the joint telescopes within the other.

It consists in an expansion-joint comprising a pipe member, a sleeve member sliding upon said pipe member, and a bearing for inclosing the sleeve member and movably holding it in position and in proper alinement.

It also consists in certain other novel constructions, combinations, and arrangements of parts, as will be hereinafter fully described and claimed.

In the acompanying drawings, Figure 1 is side elevation of a portion of a pipe, showing an expansion-joint constructed in accordance with the present invention applied thereto. Fig. 2 is a vertical central section through the said expansion-joint upon an enlarged scale. Fig. 3 is a side elevation of the same.

In using piping for various purposes, especially for conveying steam to pumps, engines, or the like, it is found necessary to provide such piping with means for relieving the strain thereon incident to change in temperature of the parts at various times. I am aware that various expansion-joints for this purpose have been used heretofore, and I am not claiming, broadly, an expansion-joint for pipes. I have invented, however, a new and useful form of expansion-joint, which I will now describe.

The expansion-joint proper consists of a pipe member 1 and an inclosing telescoping sleeve member 2. The pipe member 1 is preferably secured to a pipe-anchoring section 3, which is bolted or otherwise secured to a base-plate 4 or directly to any suitable framing, as 5. The pipe-anchoring section 3 forms a continuation of piping 6, which leads to any suitable point. The pipe member 1 of the expansion-joint is made of a uniform diameter throughout and is preferably formed with an attaching-flange 7, by which it may be bolted or otherwise secured to the anchoring-section 3. The sleeve member 2 is made of ample length to receive the pipe member 1 and permit it to have any movement longitudinally therein that could possibly occur in the expansion and contraction of the piping under changes of temperature. The sleeve 2 is formed with an inwardly-projecting annular rib, as 8, near its outer end, and packing 9 may be shouldered around the pipe-section 1. A gland member 10 is also employed, which extends into the open end of the sleeve 2, inclosing the pipe member 1, and is forced tightly against the packing 9 by means of bolts 11, as clearly illustrated in Figs. 2 and 3 of the drawings. A tight joint can thus be formed between the sleeve 2 and the pipe 1, and yet said pipe can move within the sleeve without leakage at this point. The sleeve member 2 is also provided with an attaching-flange, as 12, by which it is secured to the piping 6, in which the expansion-joint is interposed.

An important feature of my invention is the employment of means for holding the sleeve member 2 in proper alinement. This means is preferably a bearing-box, as 13. This bearing-box may be formed in two parts, one part, as 14, being bolted to the base-plate 4 or to the framing 5, while the cap-piece or part 15 is drawn thereto around the sleeve 2 by means of suitable bolts, as 16. The inner surface of the bearing-box 13 is preferably lined with Babbitt metal, as 17, forming a suitable surface for engaging the sleeve 2 and permitting of the endwise movement of the said sleeve with respect to the bearing-box. The bearing-box 13 is made to fit sufficiently snugly around the sleeve 2 to prevent any possibility of the sleeve getting out of proper alinement. The said sleeve is thus free to move not only with respect to the pipe member 1, but with respect to the bearing-box 13 under the influence of changes in temperature, and yet is prevented from being so twisted or moved out of alinement in any way as to cause the joint between the sleeve and the pipe member 1 to leak. The movement of similar expansion-joints out of alinement has heretofore been a fruitful source of difficulty with such joints and renders them leaky in most instances. By the employment of my improved box 13 the expansion-joint is enabled to work perfectly for accommodating piping to changes of temperature without causing the said joint to be subject to leakage.

I usually prefer to secure both the anchoring pipe-section 3 and the bearing-box 13 to a base-plate 4, and the base-plate 4 is therefore formed with suitable apertured lugs 18, by which it can be bolted or otherwise fastened to any suitable framing or support—such, for instance, as that illustrated in Fig. 1 of the drawings.

It will be observed that my improved means for holding the expansion-joint in proper position is exceedingly simple and yet contributes to the perfect operation of the expansion-joint.

Having thus fully described my invention, what I claim as new, and desire to secure by Letters Patent, is—

1. An expansion-joint for piping, comprising a pipe-section, an anchoring-section for holding it rigidly in place, a sleeve-section telescoping over the end of said pipe-section, means for packing the sleeve-section around the pipe-section, and a bearing-box inclosing the sleeve-section for movably holding it in proper alinement, substantially as described.

2. An expansion-joint for piping, comprising a base-plate, an anchoring pipe-section secured thereto, a pipe-joint section carried by the anchoring-section, a sleeve-section sliding upon the pipe-section, a packing-gland for forming a tight joint between the movable parts, and a guiding-box secured to the base-plate and surrounding the sleeve-section so as to hold it in proper alinement and yet permit of its movement under the action of the expansion and contraction of the pipe due to the change of temperature, substantially as described.

In testimony whereof I hereunto affix my signature in presence of two witnesses.

HENRY J. WESSINGER.

Witnesses:
JAMES T. WATSON,
JESSIE L. COOLEY.